United States Patent
Adachi et al.

(10) Patent No.: US 8,126,638 B2
(45) Date of Patent: Feb. 28, 2012

(54) ENGINE

(75) Inventors: Hitoshi Adachi, Osaka (JP); Shusuke Okada, Osaka (JP); Tomohiro Otani, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 280 days.

(21) Appl. No.: 12/665,527

(22) PCT Filed: Jul. 25, 2008

(86) PCT No.: PCT/JP2008/063386
§ 371 (c)(1),
(2), (4) Date: Dec. 18, 2009

(87) PCT Pub. No.: WO2009/014209
PCT Pub. Date: Jan. 29, 2009

(65) Prior Publication Data
US 2010/0198483 A1    Aug. 5, 2010

(30) Foreign Application Priority Data
Jul. 26, 2007  (JP) ................................. 2007-195214

(51) Int. Cl.
*F02D 41/22*   (2006.01)
(52) U.S. Cl. ........ 701/107; 701/110; 701/112; 123/481; 123/198 DB; 123/198 D; 123/436
(58) Field of Classification Search .......... 701/103–105, 701/107, 110, 112; 123/436, 479–481, 198 D, 123/198 DB
See application file for complete search history.

(56) References Cited

FOREIGN PATENT DOCUMENTS

| JP | 2001-241353 | | 9/2001 |
|---|---|---|---|
| JP | 2002-122037 | | 4/2002 |
| JP | 2004-308464 | | 11/2004 |
| JP | 2007-071191 | | 3/2007 |
| JP | 2010-59823 | * | 3/2010 |

OTHER PUBLICATIONS

International Search Report for International Application No. PCT/JP2008/063386, mailed Aug. 26, 2008, 1 page.

* cited by examiner

*Primary Examiner* — Hai Huynh
(74) *Attorney, Agent, or Firm* — Sterne, Kessler, Goldstein & Fox P.L.L.C.

(57) ABSTRACT

In an engine which may show a behavior where an engine speed is not always minimized after compression top dead center of a cylinder in which poor fuel injection occurred, the cylinder in which poor fuel injection occurred is detected. A common rail diesel engine (1) includes a individual reference number-of-revolutions output unit (30) for outputting the individual reference number of revolutions Nstdi of each cylinder corresponding to each injector (3) incident to fuel injection thereof, an engine speed sensor (6) for calculating the individual actual number of revolutions Ni of each cylinder corresponding to each injector (3) incident to fuel injection thereof, and fuel injection failure detection means for judging a cylinder temporarily judged as poor fuel injection as a cylinder of poor fuel injection when the plus and minus by a contrast arithmetic operation unit (80) coincide entirely in each cylinder and the absolute value $|\Delta Ni'|$ of the difference in number of revolutions at the time of forced stop means is entirely above the absolute value $|\Delta Ni|$ of the difference in the number of revolutions at the time of temporary judgment means.

7 Claims, 9 Drawing Sheets

ENGINE

BACKGROUND OF THE INVENTION

1. Field of the Invention

The present invention relates to a multi-cylinder engine.

2. Background Art

Conventionally, there is well known a multi-cylinder engine that each of the cylinders has a fuel injection valve. With regard to such an engine, when fuel injection failure, such as insufficient combustion, misfire or trouble of a fuel injection valve, occurs in one of cylinders, stable driving state cannot be obtained. Then, there is also well known an engine which has function of detecting a fuel injection failure cylinder.

The Japanese Patent Laid Open Gazette 2001-241353 discloses a control art as an abnormal cylinder detection means of a multi-cylinder internal combustion engine that a misfire or excessive combustion cylinder is judged based on comparison of rotation speed difference between momentary maximum rotation speed and momentary minimum rotation speed of each cylinder at an explosion process and average rotation speed change difference of all the cylinders. The Japanese Patent Laid Open Gazette 2004-308464 discloses a control art that the fuel injection valve causing the abnormality is specified based on only rotation speed change difference between the cylinders following fuel injection of an internal combustion engine having a plurality of fuel injection valves.

With regard to the art disclosed in the Japanese Patent Laid Open Gazette 2001-241353, according to the purpose of the engine or combination congeniality with a fuel injection device, the momentary rotation speed of the cylinder causing the fuel injection abnormality may not be the minimum, whereby the misfire of or excessive combustion cylinder may not be judged. With regard to the art disclosed in the Japanese Patent Laid Open Gazette 2004-308464, the judgment is executed based on the relative information between the cylinders. Then, when all the cylinders are deteriorated with time, the fuel injection abnormality may not be detected.

BRIEF SUMMARY OF THE INVENTION

Problems to Be Solved by the Invention

The purpose of the present invention is to provide an engine that a cylinder causing fuel injection failure can be detected even if rotation speed after a compression top dead point of the cylinder causing the fuel injection failure. The another purpose is to make the normal state of each cylinder to be the standard so as to improve detection accuracy of the fuel injection failure.

Means for Solving the Problems

An engine according to the present invention, having a plurality of cylinders wherein a fuel injection valve is provided in each of the cylinders and opening timing of each of the fuel injection valves can be controlled respectively, is characterized by having a fuel injection failure detection means comprising: an individual standard rotation speed output means which outputs individual standard rotation speed of each of the cylinders following fuel injection of the corresponding fuel injection valve when all the fuel injection valves are in normal state; an individual actual rotation speed calculation means which calculates individual actual rotation speed of each of the cylinders following the fuel injection of the corresponding fuel injection valve; a temporary judgment means which calculates rotation speed difference of the cylinders based on the individual standard rotation speed and the individual actual rotation speed of each of the cylinders and judges temporarily that at least one of the cylinders causes the fuel injection failure when the rotation speed difference is higher than predetermined value; a difference storage means in which the rotation speed difference of the cylinders is stored; a forced stop means which stops forcedly fuel injection to the cylinders respectively following the temporary judgment; and a contrast arithmetic operation means which operates contrastively the rotation speed difference of each of the cylinders at the time of temporary judgment with rotation speed difference of each of the cylinders at the time of the forced stop of fuel injection to the cylinders respectively, wherein when positive and negative of the rotation speed difference of each of the cylinders at the time of temporary judgment is in agreement with that at the time of the forced stop of fuel injection to one of the cylinders and each rotation speed difference at the time of the forced stop of fuel injection to the certain cylinder is not less than the absolute value of rotation speed difference at the time of the temporary judgment in a fuel injection forced stop pattern of each of the cylinder as the result of the contrast arithmetic operation, the fuel injection failure detection means judges that the cylinder that the fuel injection thereto is stopped forcedly causes the fuel injection failure.

With regard to the engine of the present invention, preferably, the individual standard rotation speed output means stores difference from the standard rotation speed for each engine rotation speed region or each load region, and the difference from the standard rotation speed of each of the cylinders is selected corresponding to the engine rotation speed region or the load region.

With regard to the engine of the present invention, preferably, the individual standard rotation speed output means regards crank angle at a center point between a compression top dead point of the certain cylinder and a compression top dead point of the next cylinder at a time that all the fuel injection valves are in normal state as standard crank angle of the certain cylinder, and average of actual rotation speed based on fixed change of crank angle until reaching standard of crank angle of each of the cylinders is selected as the individual standard rotation speed of the cylinder, and the individual actual rotation speed calculation means regards crank angle at a center point between a compression top dead point of the certain cylinder and a compression top dead point of the next cylinder as standard crank angle of the certain cylinder, and average of actual rotation speed based on fixed change of crank angle until reaching standard of crank angle of each of the cylinders is selected as the individual actual rotation speed of the cylinder.

With regard to the engine of the present invention, preferably, the individual standard rotation speed output means selects maximum actual rotation speed from a compression top dead point of each of the cylinders to a compression top dead point of the corresponding next cylinder at a time that all the fuel injection valves are in normal state as the individual standard rotation speed, and the individual actual rotation speed calculation means selects maximum actual rotation speed from a compression top dead point of each of the cylinders to a compression top dead point of the corresponding next cylinder as the individual actual rotation speed.

With regard to the engine of the present invention, preferably, the individual standard rotation speed output means selects rotation speed at a time of production and shipment or at a time of regulation of the fuel injection valves as the individual standard rotation speed.

With regard to the engine of the present invention, preferably, the individual standard rotation speed output means selects rotation speed in a state that the engine is connected to a working machine at a time that all the fuel injection valves are in normal state as the individual standard rotation speed.

With regard to the engine of the present invention, preferably, the engine has a detection means detecting a driving state of the engine, and the revision amount calculation means calculates revision amount when the detection means detects a setting state of the engine.

Effect of the Invention

According to the engine of the present invention, the cylinder causing the fuel injection failure can be detected even if rotation speed after a compression top dead point of the cylinder causing the fuel injection failure. Though the fuel injection valve of each of the cylinders is degraded secularly or the like, since the judgment is based on the individual standard rotation speed at the time that the fuel injection valve of each of the cylinders is at the normal state, the cylinder causing the fuel injection failure can be detected.

According to the engine of the present invention, with regard to the engine that the rotation speed after the compression top dead point of the cylinder causing the fuel injection failure is not always the minimum for each engine rotation speed region or each load region, the cylinder causing the fuel injection failure can be detected.

According to the engine of the present invention, the detection accuracy of the cylinder at which the fuel injection failure occurs can be improved based on the rotation speed corresponding to the combustion process of each cylinder.

According to the engine of the present invention, even if the change of rotation speed between the compression top dead point of each of the cylinders and the compression top dead point of the next cylinder is asymmetric about the crank angle at the expansion bottom dead point, the detection accuracy of the cylinder at which the fuel injection failure occurs can be improved based on the rotation speed corresponding to the combustion process.

According to the engine of the present invention, the cylinder at which the fuel injection failure occurs can be detected without influence of secular degradation and the like.

According to the engine of the present invention, in the case that the engine is unitized with a working vehicle such as a hydraulic pump or a dynamo which is always connected to the engine, with regard to the engine that the rotation speed after the compression top dead point of the cylinder causing the fuel injection failure is not always the minimum, the cylinder causing the fuel injection failure can be detected.

According to the engine of the present invention, the cylinder causing the fuel injection failure can be detected exclusive of influence of change of rotation at the transitional period caused by the acceleration/deceleration or change of the load.

BRIEF DESCRIPTION OF DRAWINGS/FIGURES

DETAILED DESCRIPTION OF THE INVENTION

The Best Mode For Carrying Out The Invention

Next, explanation will be given on the mode for carrying out the invention.

Figure 1:
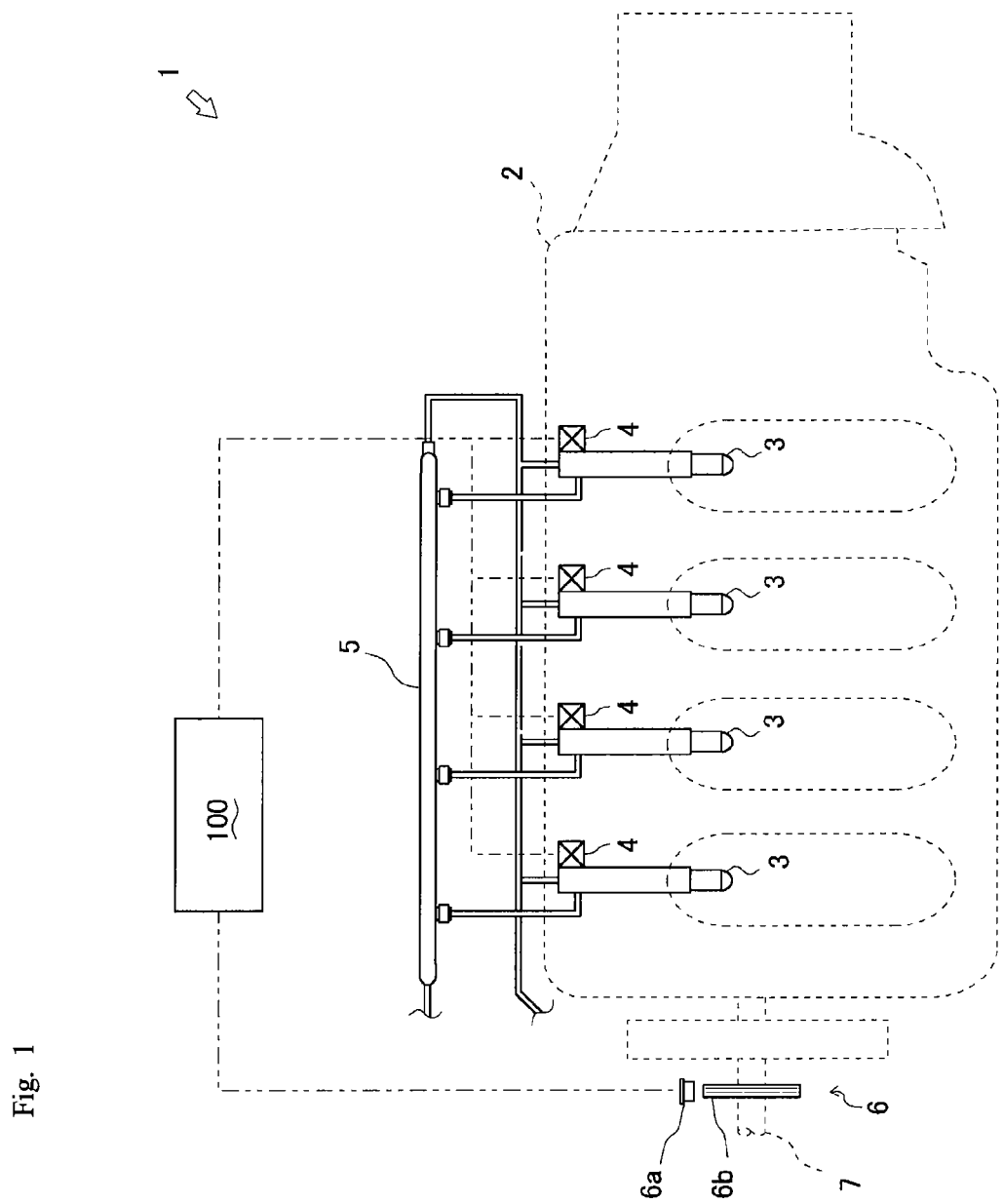
FIG. 1 is a schematic drawing of entire construction of a common-rail type diesel engine according to the embodiment of the present invention.
Figure 2:
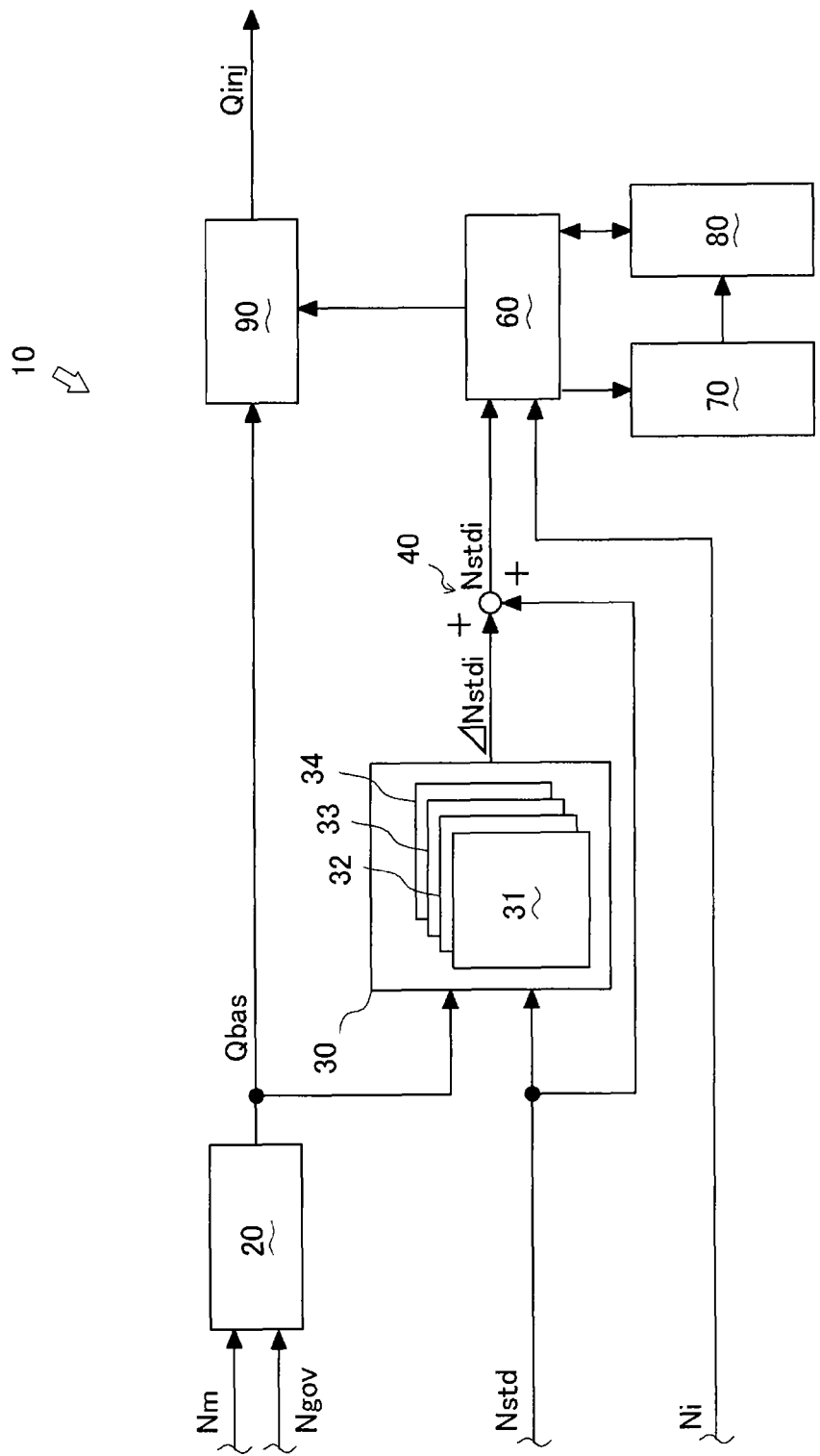
FIG. 2 is a block drawing of a fuel injection failure cylinder detection means.
Figure 3:
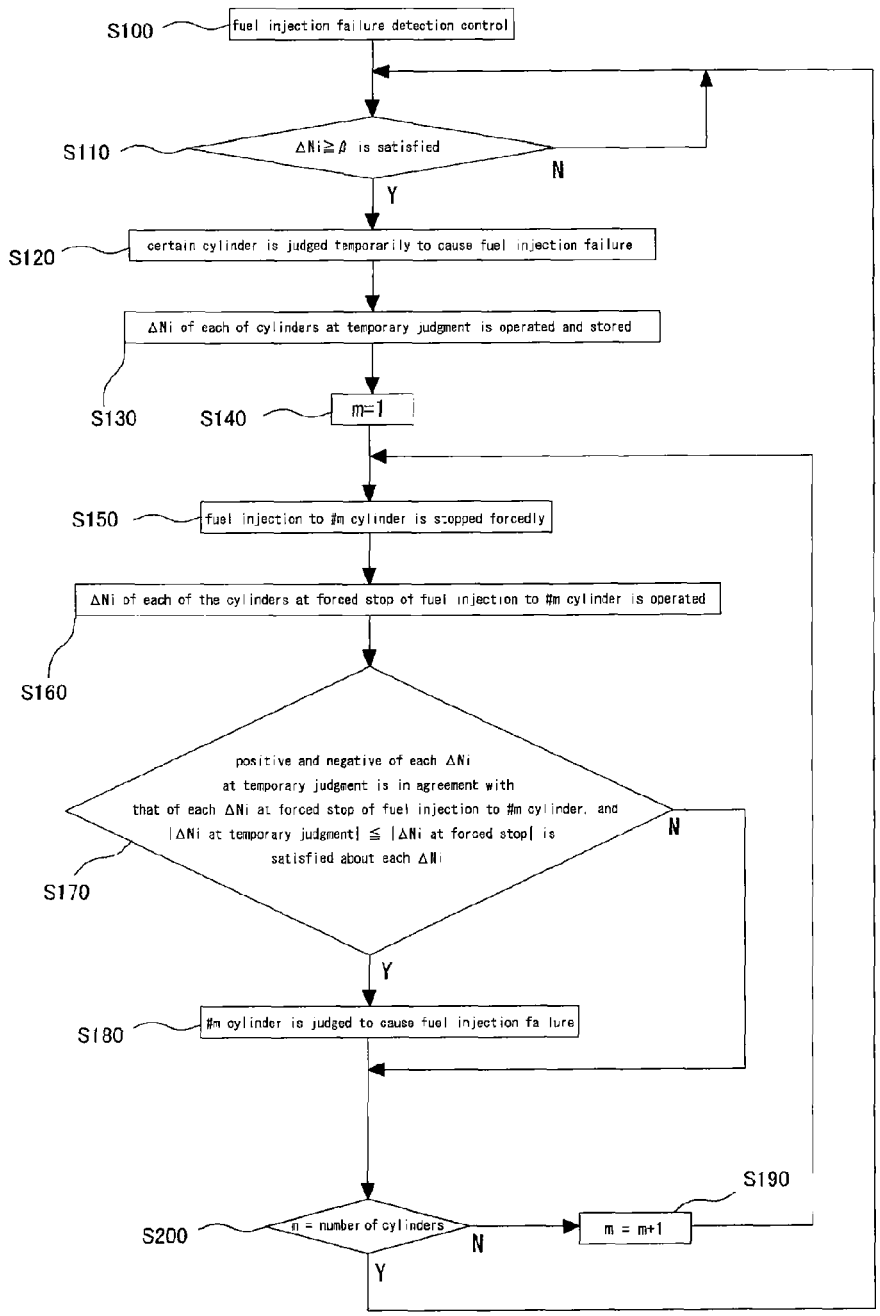
FIG. 3 is a flow chart of fuel injection failure cylinder detection control.

FIG. 1 is a schematic drawing of entire construction of a common-rail type diesel engine according to the embodiment of the present invention. FIG. 2 is a block drawing of a fuel injection failure cylinder detection means. FIG. 3 is a flow chart of fuel injection failure cylinder detection control.

Figure 4:
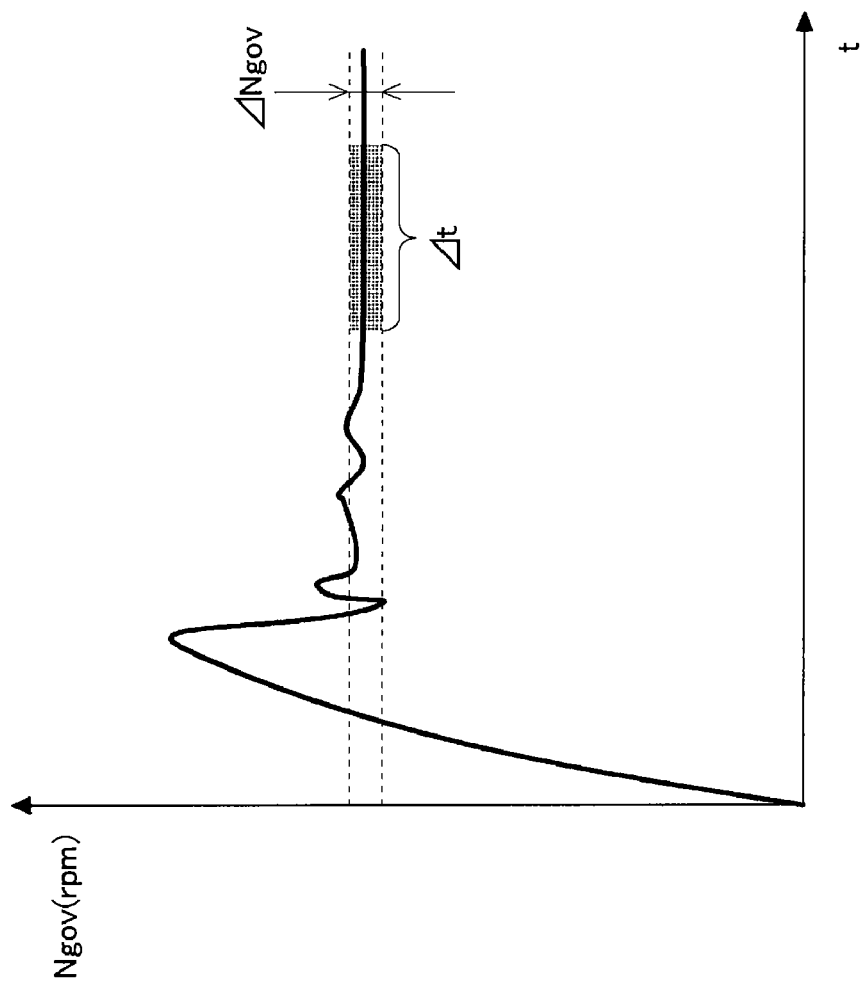
FIG. 4 is a graph of timing of fuel injection failure cylinder detection.
Figure 5:
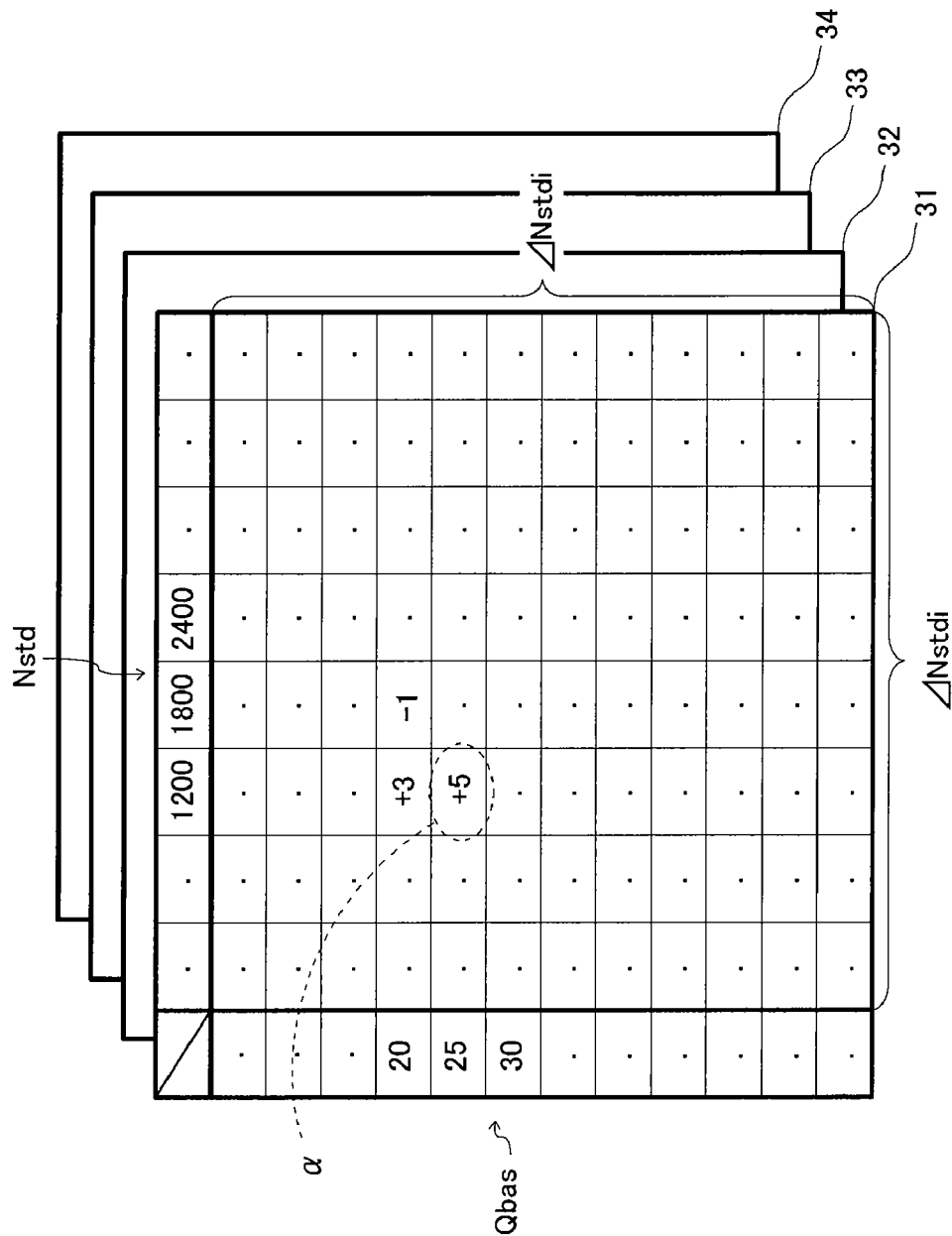
FIG. 5 is a table drawing of standard rotation speed maps.
Figure 6:
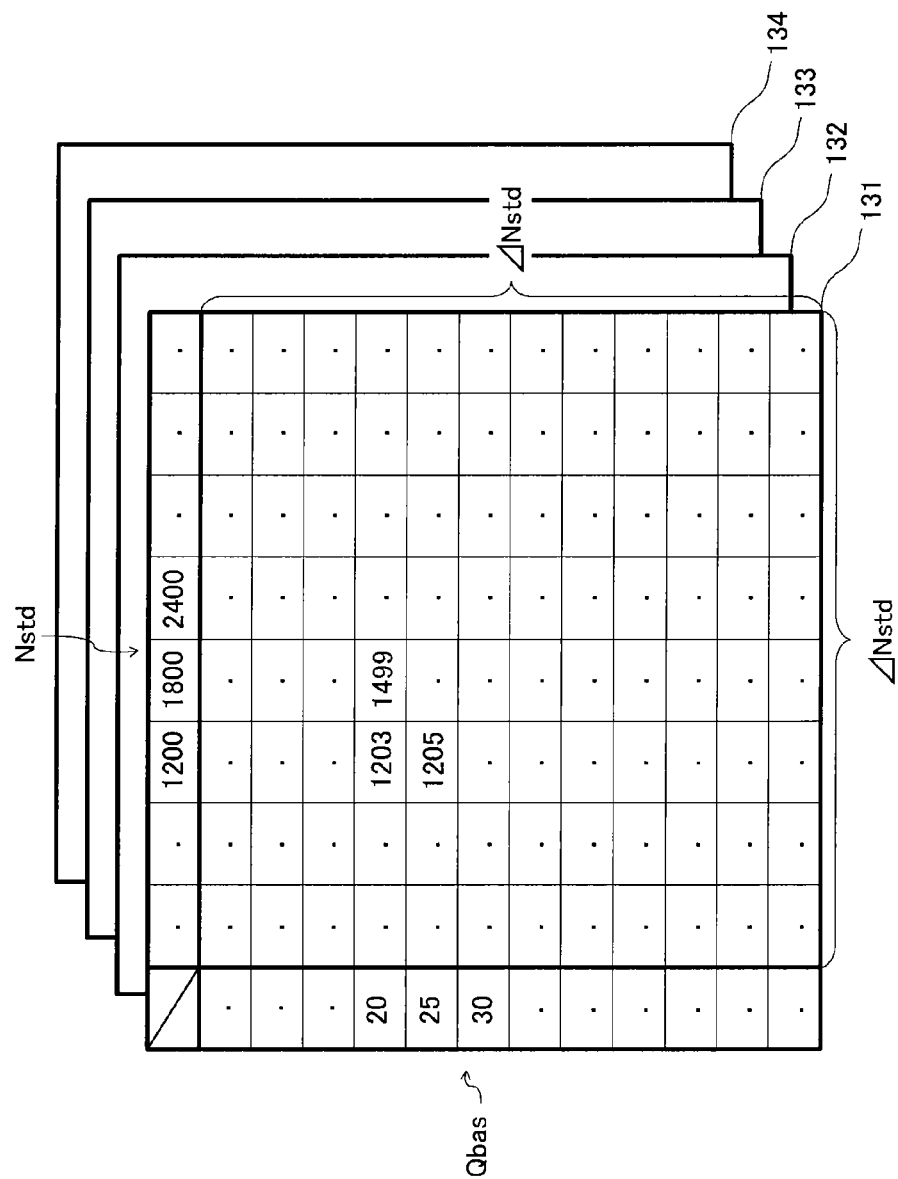
FIG. 6 is a table drawing of another standard rotation speed maps.

FIG. 4 is a graph of timing of fuel injection failure cylinder detection. FIG. 5 is a table drawing of standard rotation speed maps. FIG. 6 is a table drawing of another standard rotation speed maps.

Figure 7:
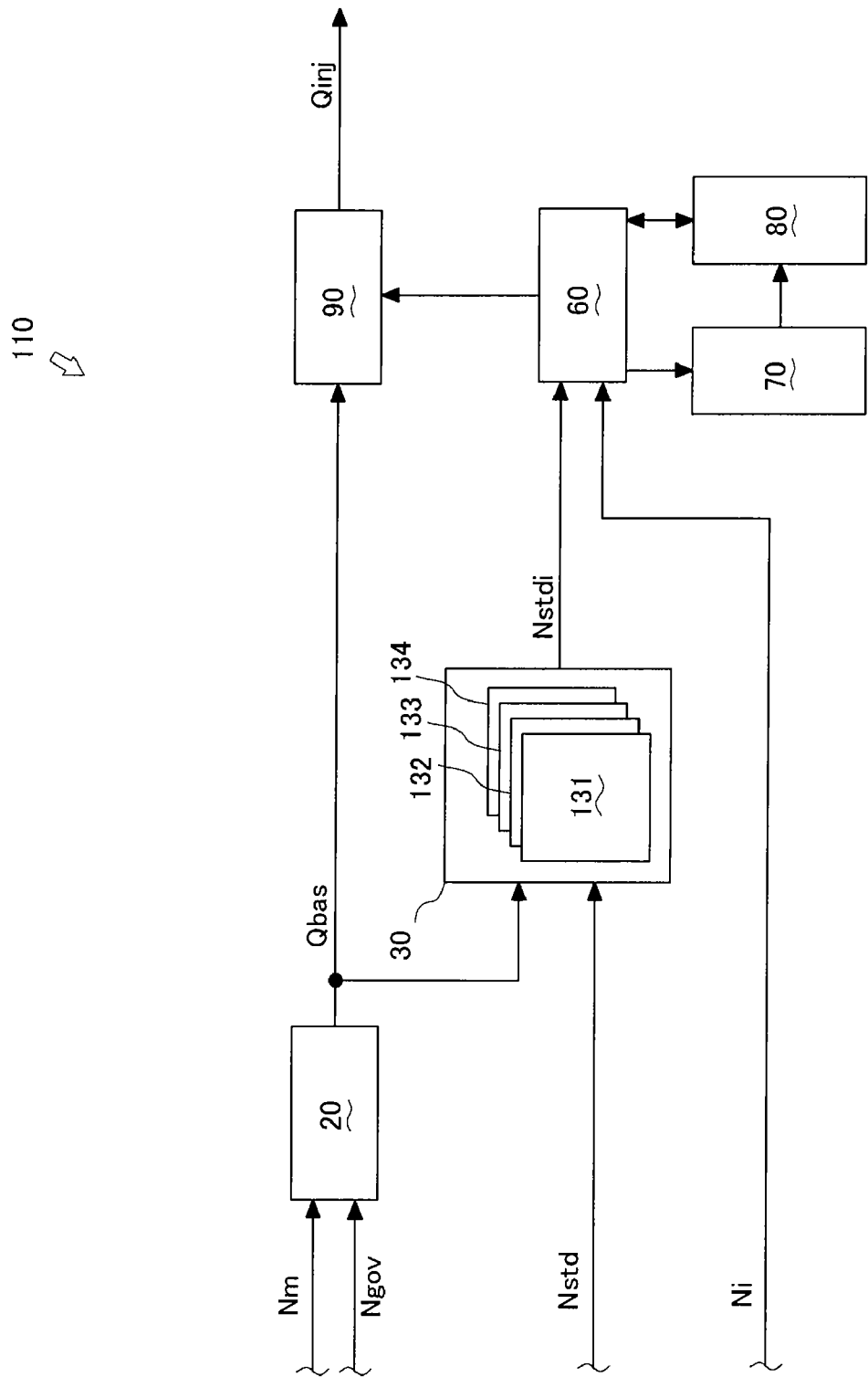
FIG. 7 is a block drawing of another fuel injection failure cylinder detection means.
Figure 8:
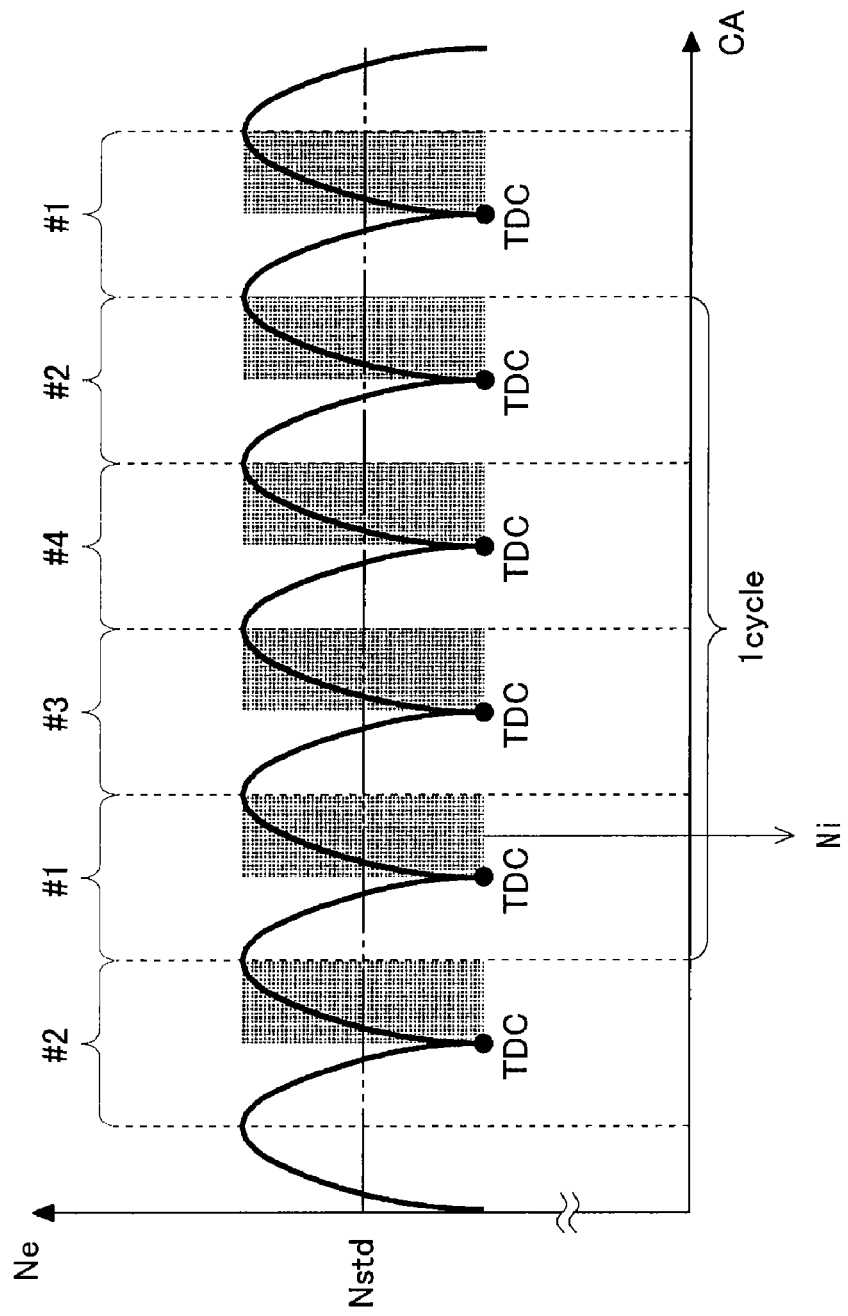
FIG. 8 is a graph of rotation speed against crank angle showing operation timing about standard rotation speed.
Figure 9:
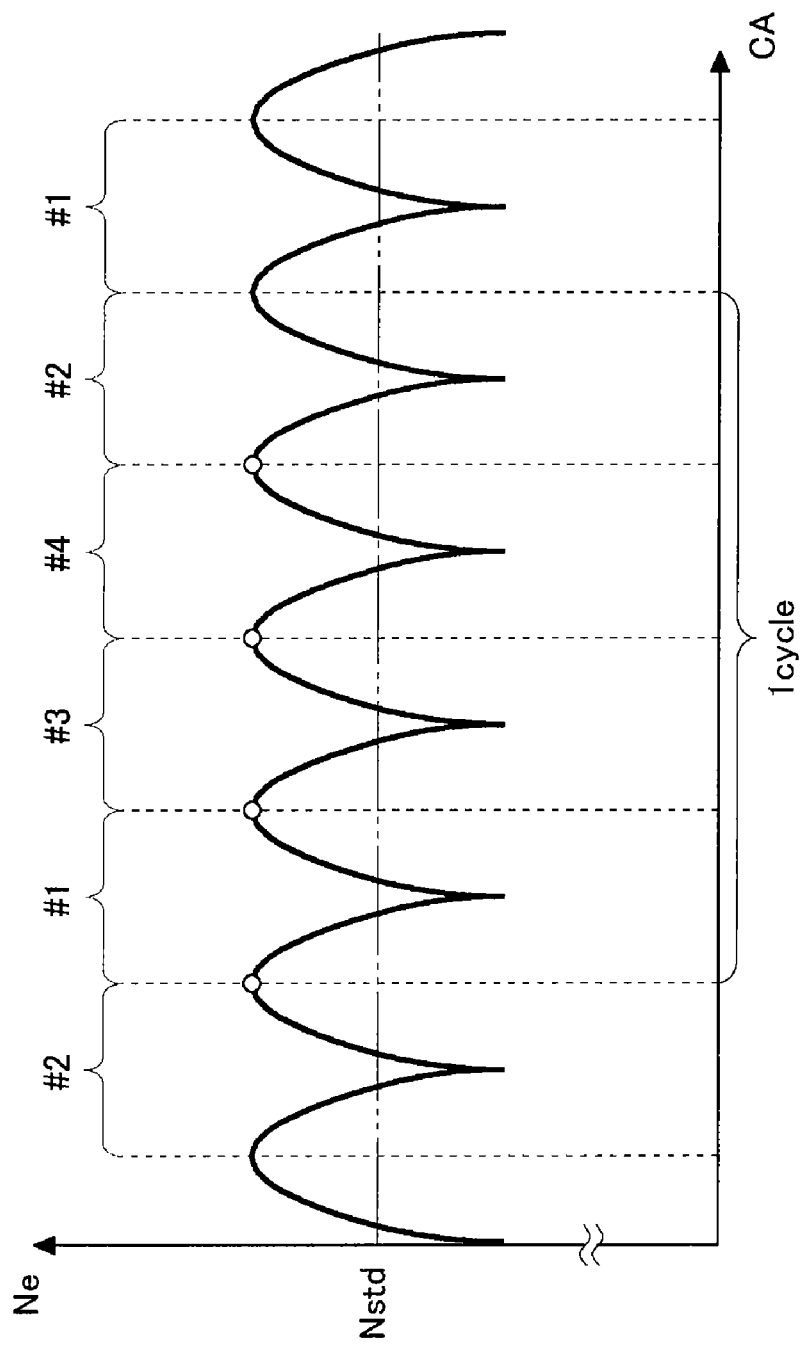
FIG. 9 is a graph of rotation speed against crank angle showing another operation timing about standard rotation speed.

FIG. 7 is a block drawing of another fuel injection failure cylinder detection means. FIG. 8 is a graph of rotation speed against crank angle showing operation timing about standard rotation speed. FIG. 9 is a graph of rotation speed against crank angle showing another operation timing about standard rotation speed.

Explanation will be given on a four-cylinder four-cycle common-rail type diesel engine (hereinafter, referred to as "engine") 1 as an embodiment of the present invention referring to FIG. 1.

As shown in FIG. 1, the engine 1 comprises a diesel engine main body (hereinafter, referred to as "engine main body") 2, four injectors 3, a common rail 5 and an engine control unit (hereinafter, referred to as "ECU") 100.

The engine main body 2 is a main body of the four-cylinder four-cycle diesel engine. Each of the injectors 3 has an electromagnetic valve 4 and is disposed in corresponding one of the cylinders as a fuel injection valve. High pressure fuel is accumulated in the common rail 5, and the high pressure fuel is distributed to the injectors 3. The ECU 100 controls each of the electromagnetic valves 4 of the injectors 3 individually to open and close so as to inject optimal amount of fuel to the cylinders of the engine main body 2 at optimal timing.

The present invention is not limited to the engine 1 and any engine which can control individually opening timing of each fuel injection valve can be used. The number of cylinders is also not limited.

The engine 1 has an engine rotation speed sensor 6 as an individual actual rotation speed calculation means. The engine rotation speed sensor 6 is connected to the ECU 100. The engine rotation speed sensor 6 comprises a pulse sensor 6a and a pulser 6b, and calculates rotation speed based on the time required for fixed change of angle of a crankshaft 7 provided in the engine main body 2 (distance between pulse detection times).

Explanation will be given on standard rotation speed Nstd and individual actual rotation speed Ni ("i" indicates each of the cylinders) referring to FIG. 7. FIG. 7 shows change of rotation speed (angular speed) of each of the cylinders (#1 to #4) while the axis of abscissas indicates crank angle (CA) and the axis of ordinates indicates rotation speed (Ne). The engine 1 of this embodiment is the four-cylinder four-cycle diesel engine and has a combustion cycle that fuel is injected to a first cylinder (#1), a third cylinder (#3), a fourth cylinder (#4), and a second cylinder (#2) in this order and the crankshaft is made two revolutions over one cycle. The rotation speed is minimum at the crank angle of the top dead point (TDC) of each cylinder.

The standard rotation speed Nstd is the average of angular speed accompanying the fuel injection of each cylinder and is shown by a two-dot chain line in FIG. 7. The individual actual rotation speed Ni is angular speed accompanying the fuel injection of each cylinder. The crank angle at the TDC of the certain cylinder is referred to as "TDC crank angle", and the crank angle at the center point between the TDC of the certain cylinder and the TDC of the next cylinder (the point showing the maximum rotation speed in FIG. 7) is referred to as "standard crank angle". Then, the individual actual rotation speed Ni is the average of rotation speed between the TDC crank angle and the standard crank angle of each cylinder. Namely, the individual actual rotation speed Ni of each cylinder is the average of rotation speed in the meshed part of FIG. 7.

The standard rotation speed Nstd of each cylinder is the individual actual rotation speed Ni that all the cylinders are at the initial state. The initial state means enough maintained state such as at the shipment or just after the maintenance, and is referred to as "normal state" in this specification. Though the individual actual rotation speed Ni is defined as the average of rotation speed between the TDC crank angle and the standard crank angle of each cylinder, the starting point may be shifted forward or rearward from the TDC crank angle. In effect, what is required is only to set the starting point crank angle to the standard crank angle so as to reflect the rotation speed in the combustion process of the certain cylinder.

As shown in FIG. 2, the fuel injection amount revision system 10 comprises a basic injection amount output unit 20, an individual standard rotation speed output unit 30, a difference operation unit 40, an injection amount operation unit 60, a difference storage unit 70, a contrast arithmetic operation unit 80 and a forced stop unit 90.

The basic injection amount output unit 20 outputs basic injection amount Qbas from engine target rotation speed Nm and engine actual rotation speed Ngov. Namely, the basic injection amount output unit 20 outputs the basic injection amount Qbas so as to make the engine actual rotation speed Ngov close to the engine target rotation speed Nm. The basic injection amount output unit 20 outputs the basic injection amount Qbas so as to decrease the difference between the engine target rotation speed Nm and the engine actual rotation speed Ngov for example by PID control.

The purpose of the basic injection amount output unit 20 is not to perform the control of the rotation speed of each cylinder which is the concept of the present invention, but to stabilize the rotation speed of the whole engine 1. The engine actual rotation speed Ngov in this embodiment is the moving average from the latest Ni to Ni of the cylinder several numbers before.

The individual standard rotation speed output unit 30 outputs individual standard rotation speed difference ΔNstdi from the basic injection amount Qbas and the standard rotation speed Nstd.

Furthermore, the individual standard rotation speed output unit 30 has individual standard rotation speed difference maps 31 to 34 as selection means respectively corresponding to the four cylinders of the engine 1.

The difference operation unit 40 calculates individual standard rotation speed Nstdi from the standard rotation speed Nstd and the individual standard rotation speed difference ΔNstdi.

Rotation speed difference ΔNi between the individual standard rotation speed Nstdi and the individual actual rotation speed Ni of each of the cylinders is stored in a difference storage unit 70.

The temporary judgment unit 60 calculates ΔNi of each of the cylinders based on Nstdi and Ni of the cylinder. When any ΔNi is not less than predetermined value β, the temporary judgment unit 60 judges temporarily that at least one of the cylinders causes the fuel injection failure.

A contrast arithmetic operation unit 80 contrastively operates the rotation speed difference ΔNi of each of the cylinders at the time of temporary judgment with the rotation speed difference ΔNi of each of the cylinders at the time that a forced stop unit 90 stops fuel injection to the cylinders respectively.

The forced stop unit 90 forcedly stops fuel injection to the certain cylinder respectively when the cylinder is temporary judged fuel injection failure.

Next, explanation will be given on fuel injection failure detection control (S100) in detail referring FIG. 3.

As shown in FIG. 3, according to the above-mentioned construction, the fuel injection amount revision system 10 can detect the fuel injection failure cylinder.

Firstly, the temporary judgment unit 60 calculates the rotation speed difference ΔNi of each of the cylinders from the individual standard rotation speed Nstdi and the individual actual rotation speed Ni of the cylinder, and judges whether the rotation speed difference ΔNi is not less than predetermined value β or not (Y of S110). When ΔNi satisfies ΔNi≧β, the temporary judgment unit 60 judges temporarily that at least one of the cylinders causes the fuel injection failure (S120). On the other hand, when each ΔNi satisfies ΔNi<β, the temporary judgment unit 60 returns to the step S110 (N of S110). The setting of β can be changed, and β is a permissible range value (threshold) whether the fuel injection failure or not and is set in consideration of an error, change of rotation speed and the like.

When the temporary judgment unit 60 judges temporarily that at least one of the cylinders causes the fuel injection failure, the rotation speed difference ΔNi of each of the cylinders at the temporary judgment is stored in the difference storage unit 70 (S130), and a cylinder number count coefficient m is initialized (S140). In response to the temporary judgment, the forced stop unit 90 stops fuel injection in turn for one combustion cycle (judging at steps S140, S190 and S200) in which the fuel injection order of all the cylinders makes a round (S150). For example, the injection amount Qinj is set 0.

The contrast arithmetic operation unit 80 receives the operation result of ΔNi of each of the cylinders at the time that the certain cylinder is stopped the fuel injection from the temporary judgment unit 60 (S160). The contrast arithmetic operation unit 80 receives ΔNi at the time of the temporary judgment stored at S130 from the difference storage unit 70 and compares ΔNi of each of the cylinders at the time that the certain cylinder is stopped the fuel injection with ΔNi of each of the cylinders at the time of the temporary judgment so as to judge whether or not positive and negative of ΔNi of the corresponding cylinders is in agreement with each other and the absolute value of each of ΔNi is not less than the absolute value of ΔNi of the corresponding cylinder at the time of the temporary judgment (S170).

When the judgment condition of S170 is satisfied, the contrast arithmetic operation unit 80 judges the cylinder stopped forcedly causes the fuel injection failure (Y of S170, S180). Then, the temporary judgment unit 60 renews the cylinder number count coefficient m (S190).

On the other hand, when the judgment condition of S170 is not satisfied, the control flow jumps to the renewal step of the cylinder number count coefficient m (N of S170).

Then, the temporary judgment unit 60 and the contrast arithmetic operation unit 80 repeat the fuel injection forced stop drive until the cylinder number count coefficient m reaches the number of the cylinders (N of S200). When the cylinder number count coefficient m reaches the number of the cylinders, the fuel injection failure detection control is repeated from the step S110 (Y of S200).

Accordingly, with regard to the engine that the rotation speed after the compression top dead point of the cylinder causing the fuel injection failure is not always the minimum, the cylinder causing the fuel injection failure can be detected.

Though the fuel injection valve of each of the cylinders is degraded secularly, since the judgment is based on the individual standard rotation speed at the time that the fuel injection valve of each of the cylinders is at the normal state, the cylinder causing the fuel injection failure can be detected.

Explanation will be given on the timing of the fuel injection failure detection control (S100) with the fuel injection amount revision system 10 referring to FIG. 4.

FIG. 4 shows the time series change of the individual actual rotation speed Ngov detected by the engine rotation speed sensor 6. As shown in FIG. 4, the fuel injection failure detection control with the fuel injection amount revision system 10 is executed only when the individual actual rotation speed Ngov is converged within predetermined engine actual rotation speed width ΔNgov for predetermined time Δt.

Namely, the fuel injection failure detection control based on the individual standard rotation speed Nstdi is executed at the permanent period, and the fuel injection failure detection control is stopped at the transitional period.

Accordingly, the cylinder causing the fuel injection failure can be detected exclusive of influence of change of rotation at the transitional period caused by the acceleration/deceleration of the engine or change of the load.

Explanation will be given on the individual standard rotation speed difference maps 31 to 34 as selection means in detail referring to FIG. 5. The individual standard rotation speed difference ΔNstdi is difference of rotation speed between the individual actual rotation speed Ni of each of the cylinders (the individual standard rotation speed Nstdi) and the standard rotation speed Nstd in the case that all the fuel injection valves are at the normal state, and is previously provided for each engine load and each individual standard rotation speed Nstdi. Each of the individual standard rotation speed difference maps 31 to 34 is indicated by the matrix that the line is the basic injection amount Qbas as an alternate index of the engine load and the row is the standard rotation speed Nstd as the engine rotation speed. Namely, each of the individual standard rotation speed difference maps 31 to 34 shows dispersion of the corresponding cylinder against the standard rotation speed Nstd for each load state and each standard rotation speed.

For example, in FIG. 5, with regard to the cylinder having the individual standard rotation speed difference map 31, a cell a shows that the individual standard rotation speed difference ΔNstdi is +5 in the driving state that the basic injection amount Qbas is 25 mm3/st and the standard rotation speed Nstd is 1200 rpm, whereby the individual standard rotation speed Nstdi is shown to be 1205 rpm.

The engine load is alternated with the basic injection amount Qbas above. However, in the case of a dynamo or a hydraulic pump that engine load is clear, the engine load itself may be used as an argument.

Accordingly, with regard to the engine that the rotation speed after the compression top dead point of the cylinder causing the fuel injection failure is not always the minimum for each engine rotation speed region or each load region, the cylinder causing the fuel injection failure can be detected.

Explanation will be given on a fuel injection failure detection system 110 which is another embodiment of the present invention in detail referring to FIGS. 6 and 7.

As shown in FIG. 6, each of individual standard rotation speed maps 131 to 134 indicates the individual standard rotation speed Nstdi itself. Each of the individual standard rotation speed maps 131 to 134 indicates a matrix that the line is the basic injection amount Qbas as an alternate index of the engine load and the row is the standard rotation speed Nstd as the engine rotation speed.

As shown in FIG. 7, the fuel injection failure detection system 110 comprises the basic injection amount output unit 20, the individual standard rotation speed output unit 30, the temporary judgment unit 60, the difference storage unit 70, the contrast arithmetic operation unit 80, and the forced stop unit 90. Namely, since each of the individual standard rotation speed maps 131 to 134 indicates the individual standard rotation speed Nstdi, it is not necessary to calculate the individual standard rotation speed Nstdi from the standard rotation speed Nstd and the individual standard rotation speed difference ΔNstdi, whereby the difference operation unit 40 can be omitted.

According to this construction, the effect similar to the fuel injection amount revision system 10 can be obtained.

Explanation will be given on another selection embodiment of the individual standard rotation speed Nstdi referring to FIG. 9.

In this embodiment, the individual standard rotation speed output unit 30 selects the maximum rotation speed in the range between the compression top dead point of the cylinder and the compression top dead point of the next cylinder (the white circle in FIG. 9) in the case that all the fuel injection valves are at the normal state as the individual standard rotation speed Nstdi of the cylinder itself. The individual actual rotation speed Ni is calculated similarly.

Since the individual standard rotation speed Nstdi of each cylinder is selected as the above, even if the change of rotation speed between the compression top dead point of each cylinder and the compression top dead point of the next cylinder is asymmetric about the crank angle, the detection accuracy of the cylinder at which the fuel injection failure occurs can be improved based on the rotation speed corresponding to the combustion process.

Next, explanation will be given on the selection method of the individual standard rotation speed difference ΔNstdi (individual standard rotation speed Nstdi) of the individual standard rotation speed difference maps 31 to 34 (131 to 134) of the individual standard rotation speed output unit 30 (130) in detail.

Firstly, explanation will be given on one of selection methods of the individual standard rotation speed difference ΔNstdi.

With regard to this selection method, the individual standard rotation speed difference ΔNstdi is defined as dispersion of rotation speed of each cylinder at the time of shipment of the common-rail type diesel engine 1 from a factory or at the time of regulation of the injectors 3. Namely, at the time of shipment or at the time of regulation of the injectors 3, the above-mentioned various kinds of data of each cylinder is obtained, and the dispersion of engine load and rotation speed between each cylinder is stored in the individual standard rotation speed difference maps 31 to 34.

Accordingly, the cylinder at which the fuel injection failure occurs can be detected without influence of secular degradation of the engine and the like.

Furthermore, explanation will be given on another selection method of the individual standard rotation speed difference ΔNstdi.

With regard to this selection method, the dispersion of rotation speed of each cylinder in the state that the crankshaft (output shaft) of the common-rail type diesel engine 1 is connected to a working machine is obtained as the individual standard rotation speed difference ΔNstdi. In this case, the working machine is a hydraulic pump, a dynamo, a reduction gear or the like. Namely, the dispersion of rotation speed of each cylinder of not the independent engine 1 but the engine in the product state (setting state) in which the engine is used actually is stored in the individual standard rotation speed difference maps 31 to 34.

Accordingly, in the case that the engine is unitized with a working vehicle such as a hydraulic pump or a dynamo which is always connected to the engine, with regard to the engine that the rotation speed after the compression top dead point of the cylinder causing the fuel injection failure is not always the minimum, the cylinder causing the fuel injection failure can be detected.

INDUSTRIAL APPLICABILITY

The present invention is adoptable to a multi-cylinder engine.

The invention claimed is:

1. An engine having a plurality of cylinders wherein a fuel injection valve is provided in each of the cylinders and opening timing of each of the fuel injection valves can be controlled respectively, characterized by having a fuel injection failure detection means comprising:
   an individual standard rotation speed output means which outputs individual standard rotation speed of each of the cylinders following fuel injection of the corresponding fuel injection valve when all the fuel injection valves are in normal state;
   an individual actual rotation speed calculation means which calculates individual actual rotation speed of each of the cylinders following the fuel injection of the corresponding fuel injection valve;
   a temporary judgment means which calculates rotation speed difference of the cylinders based on the individual standard rotation speed and the individual actual rotation speed of each of the cylinders and judges temporarily that at least one of the cylinders causes the fuel injection failure when the rotation speed difference is higher than predetermined value;
   a difference storage means in which the rotation speed difference of the cylinders is stored;
   a forced stop means which stops forcedly fuel injection to the cylinders respectively following the temporary judgment; and
   a contrast arithmetic operation means which operates contrastively the rotation speed difference of each of the cylinders at the time of temporary judgment with rotation speed difference of each of the cylinders at the time of the forced stop of fuel injection to the cylinders respectively,
   wherein when positive and negative of the rotation speed difference of each of the cylinders at the time of temporary judgment is in agreement with that at the time of the forced stop of fuel injection to one of the cylinders and each rotation speed difference at the time of the forced stop of fuel injection to the certain cylinder is not less than the absolute value of rotation speed difference at the time of the temporary judgment in a fuel injection forced stop pattern of each of the cylinder as the result of the contrast arithmetic operation, the fuel injection failure detection means judges that the cylinder that the fuel injection thereto is stopped forcedly causes the fuel injection failure.

2. The engine as set forth in claim 1, wherein
the individual standard rotation speed output means stores difference from the standard rotation speed for each engine rotation speed region or each load region, and
the difference from the standard rotation speed of each of the cylinders is selected corresponding to the engine rotation speed region or the load region.

3. The engine as set forth in claim 1, wherein
the individual standard rotation speed output means regards crank angle at a center point between a compression top dead point of the certain cylinder and a compression top dead point of the next cylinder at a time that all the fuel injection valves are in normal state as standard crank angle of the certain cylinder, and average of actual rotation speed based on fixed change of crank angle until reaching standard of crank angle of each of the cylinders is selected as the individual standard rotation speed of the cylinder, and
the individual actual rotation speed calculation means regards crank angle at a center point between a compression top dead point of the certain cylinder and a compression top dead point of the next cylinder as standard crank angle of the certain cylinder, and average of actual rotation speed based on fixed change of crank angle until reaching standard of crank angle of each of the cylinders is selected as the individual actual rotation speed of the cylinder.

4. The engine as set forth in claim 1, wherein
the individual standard rotation speed output means selects maximum actual rotation speed from a compression top dead point of each of the cylinders to a compression top dead point of the corresponding next cylinder at a time that all the fuel injection valves are in normal state as the individual standard rotation speed, and
the individual actual rotation speed calculation means selects maximum actual rotation speed from a compression top dead point of each of the cylinders to a compression top dead point of the corresponding next cylinder as the individual actual rotation speed.

5. The engine as set forth in claim 1, wherein
the individual standard rotation speed output means selects rotation speed at a time of production and shipment or at a time of regulation of the fuel injection valves as the individual standard rotation speed.

6. The engine as set forth in claim 1, wherein
the individual standard rotation speed output means selects rotation speed in a state that the engine is connected to a working machine at a time that all the fuel injection valves are in normal state as the individual standard rotation speed.

7. The engine as set forth in claim 1, wherein
the engine has a detection means detecting a driving state of the engine, and
the revision amount calculation means calculates revision amount when the detection means detects a setting state of the engine.

* * * * *